US008602279B2

(12) United States Patent
Sautter et al.

(10) Patent No.: US 8,602,279 B2
(45) Date of Patent: *Dec. 10, 2013

(54) PIVOTING HITCH-MOUNTABLE BICYCLE CARRIER

(75) Inventors: Chris Sautter, Portland, OR (US); Mike Kemery, Portland, OR (US); Zac Elder, Portland, OR (US); Andrew Austin, Sherwood, OR (US); Richard Jeli, Milwaukie, OR (US); Aaron Foley, Campbell, CA (US); Steve Rodden, Sherwood, OR (US)

(73) Assignee: Yakima Innovation Development Corporation, Georgetown, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 13/528,746

(22) Filed: Jun. 20, 2012

(65) Prior Publication Data
US 2013/0020364 A1    Jan. 24, 2013

Related U.S. Application Data

(63) Continuation of application No. 12/217,772, filed on Jul. 7, 2008, now Pat. No. 8,235,268.

(60) Provisional application No. 60/958,568, filed on Jul. 6, 2007.

(51) Int. Cl.
*B60R 9/06*    (2006.01)
(52) U.S. Cl.
USPC ........... 224/506; 224/495; 224/497; 224/504; 224/521; 224/536; 224/924

(58) Field of Classification Search
USPC ......... 224/321, 324, 488, 495, 497, 502–509, 224/511, 512, 518, 519, 521, 532, 534, 536, 224/537, 549, 553, 568, 570, 571, 924; 280/762; 414/462
See application file for complete search history.

(56) References Cited

U.S. PATENT DOCUMENTS

| | | | |
|---|---|---|---|
| 5,094,373 A | 3/1992 | Lovci | |
| 5,169,042 A | 12/1992 | Ching | |
| 5,190,195 A | 3/1993 | Fullhart et al. | |
| 5,259,542 A | 11/1993 | Newbold et al. | |
| 5,664,717 A | 9/1997 | Joder | |
| 5,685,686 A | 11/1997 | Burns | |
| 5,730,345 A | 3/1998 | Yeckley et al. | |
| 5,775,560 A | 7/1998 | Zahn et al. | |
| 5,931,362 A | 8/1999 | Chimenti | |
| 5,950,891 A | 9/1999 | Brungardt et al. | |
| 5,992,720 A | 11/1999 | Miller | |

(Continued)

OTHER PUBLICATIONS

US Patent and Trademark Office, Office Action regarding U.S. Appl. No. 12/217,771, Jun. 10, 2011, 7 pages.

(Continued)

*Primary Examiner* — Gary Elkins
(74) *Attorney, Agent, or Firm* — Kolisch Hartwell, P.C.

(57) ABSTRACT

A bicycle rack is configured for mounting to a hitch behind a vehicle. The bike rack may include a mast and a mechanism for locking the mast in an upright position, or alternatively, permitting downward rotation of the mast away from the vehicle for access purposes. The rack includes arms and mounting devices for supporting various tubular components for the bicycle frame.

18 Claims, 5 Drawing Sheets

(56) References Cited

U.S. PATENT DOCUMENTS

| | | | |
|---|---|---|---|
| 6,206,259 B1 | 3/2001 | Brungardt et al. | |
| 6,283,349 B1 | 9/2001 | Morris et al. | |
| 6,286,738 B1 | 9/2001 | Robins et al. | |
| 6,321,962 B1 | 11/2001 | Morris et al. | |
| 6,386,407 B1 | 5/2002 | Erickson et al. | |
| 6,401,999 B1 * | 6/2002 | Hehr | 224/502 |
| 6,409,065 B1 | 6/2002 | Edgerly | |
| 6,467,664 B2 | 10/2002 | Robins et al. | |
| 6,616,023 B1 | 9/2003 | Dahl et al. | |
| 6,644,525 B1 | 11/2003 | Allen et al. | |
| 6,745,926 B2 | 6/2004 | Chimenti | |
| 6,918,520 B2 | 7/2005 | Skinner | |
| 6,929,163 B1 * | 8/2005 | Pedrini et al. | 224/506 |
| 6,974,147 B1 | 12/2005 | Kolda | |
| 6,988,645 B1 | 1/2006 | Nusbaum et al. | |
| 7,055,725 B1 | 6/2006 | Kolda | |
| 7,213,731 B1 | 5/2007 | Kolda | |
| 8,210,408 B2 | 7/2012 | Sautter et al. | |
| 8,235,268 B2 | 8/2012 | Sautter et al. | |
| 2005/0061842 A1 | 3/2005 | Tsai | |
| 2006/0091173 A1 | 5/2006 | Morales et al. | |
| 2006/0237504 A1 | 10/2006 | Settelmayer et al. | |
| 2006/0273125 A1 | 12/2006 | Bogoslofski et al. | |
| 2007/0057001 A1 | 3/2007 | Wang | |
| 2008/0093404 A1 | 4/2008 | Clausen et al. | |

OTHER PUBLICATIONS

US Patent and Trademark Office, Office Action regarding U.S. Appl. No. 12/217,771, Dec. 12, 2011, 10 pages.

* cited by examiner

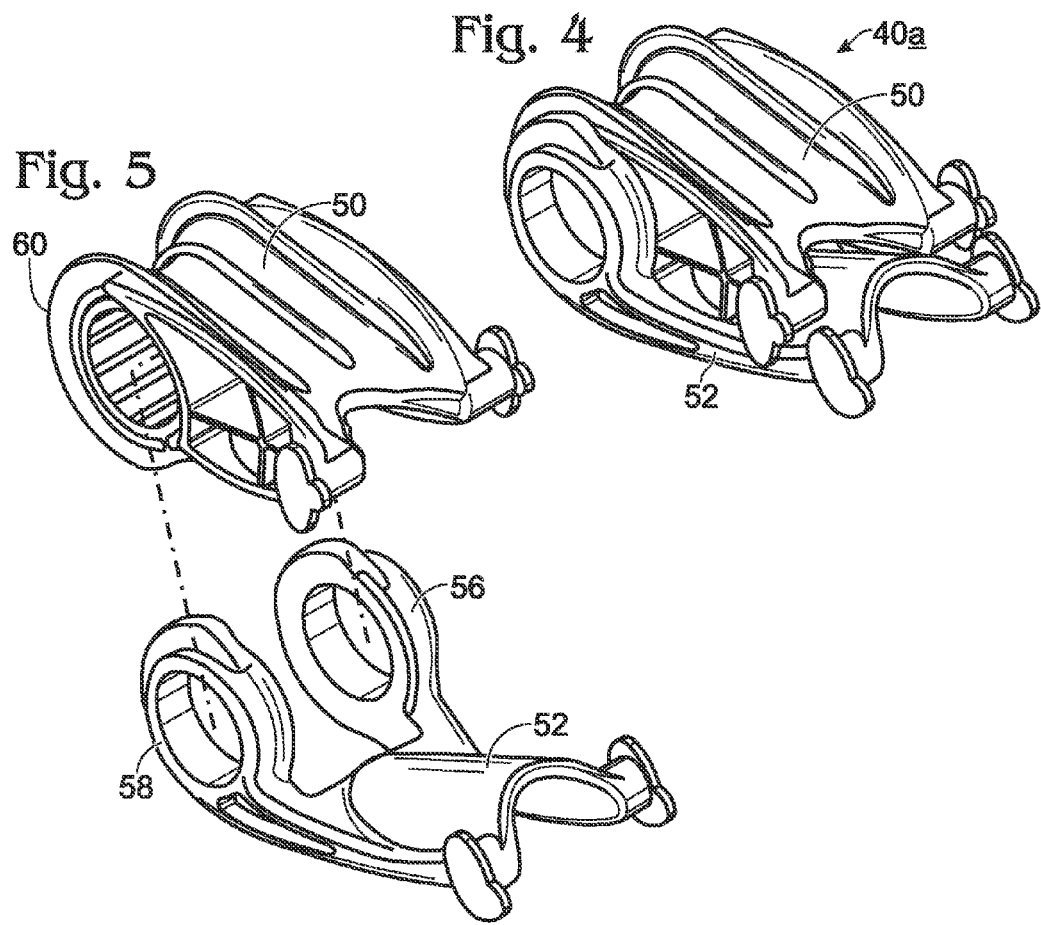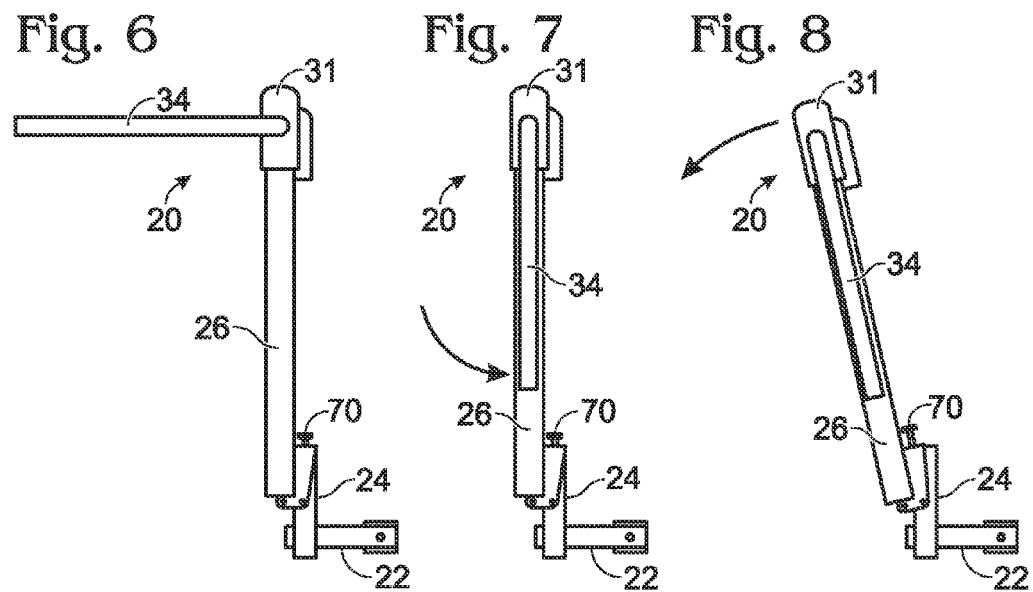

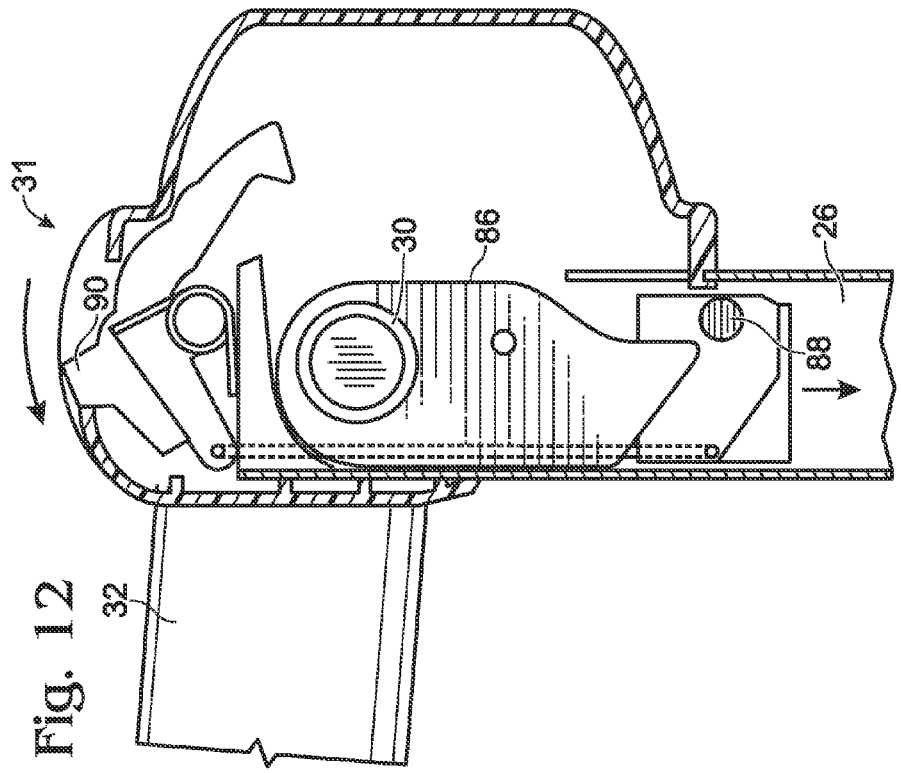
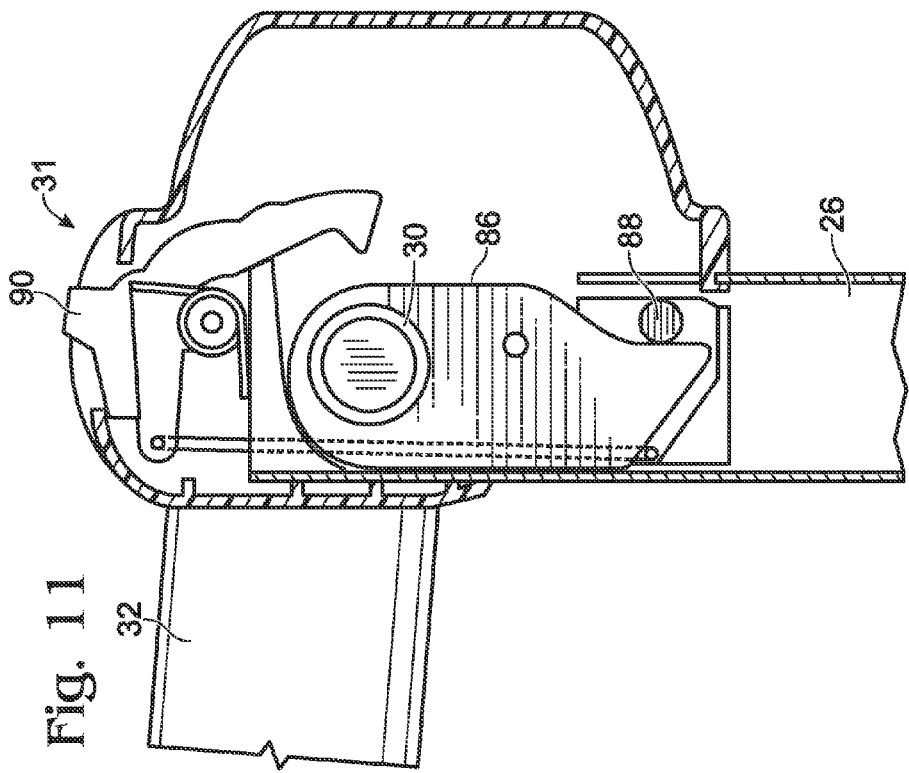

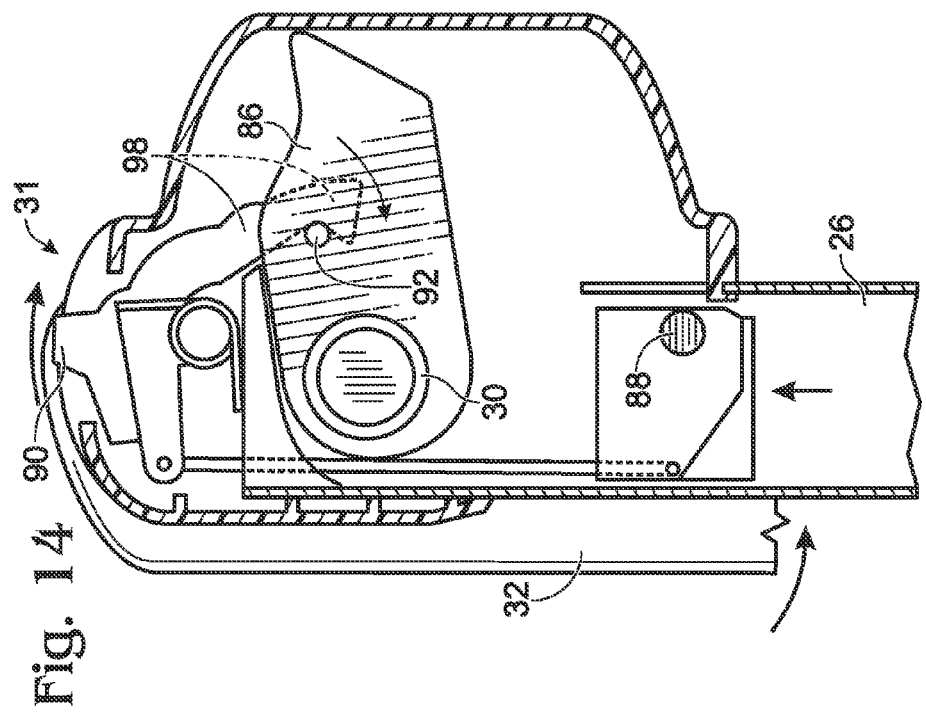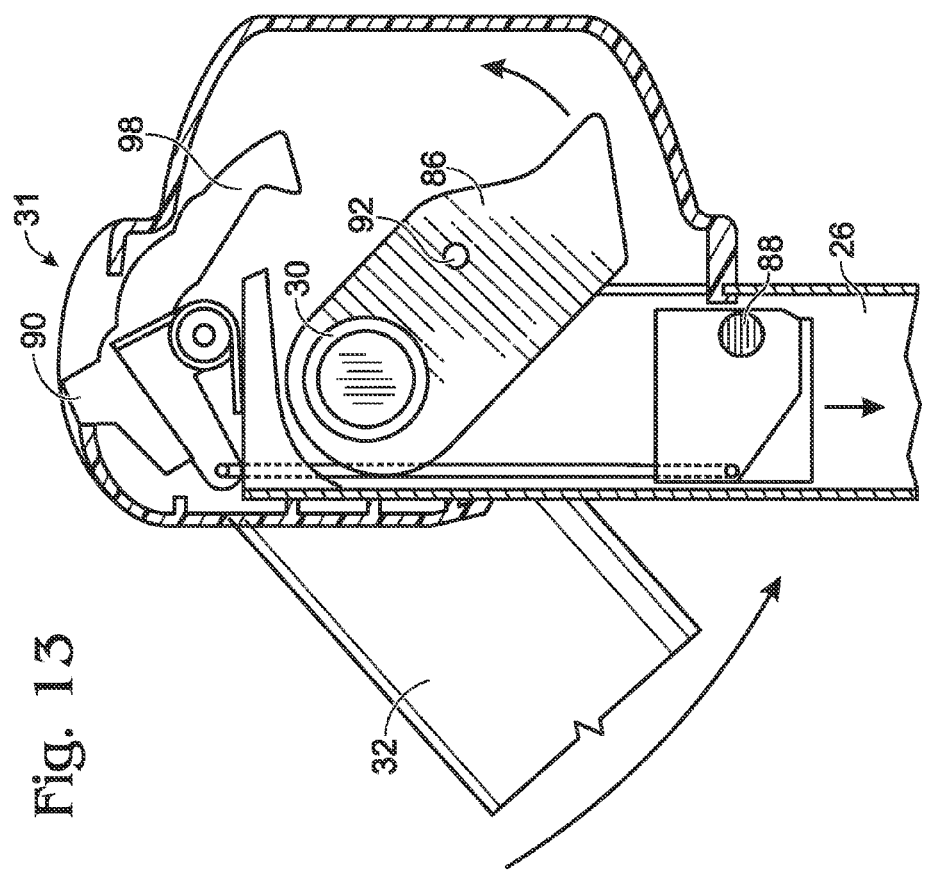

PIVOTING HITCH-MOUNTABLE BICYCLE CARRIER

CROSS-REFERENCE TO RELATED APPLICATIONS

This application is a continuation of U.S. patent application Ser. No. 12/217,772 filed Jul. 7, 2008 which claims priority under 35 U.S.C. §119(e) to U.S. Provisional Patent Application Ser. No. 60/958,568, which was filed on Jul. 6, 2007 and is entitled "Mast Style Hitch Mounted Racks for Vehicles". The complete disclosures of the above-identified patent applications are hereby incorporated by reference for all purposes.

This application also incorporates by reference in their entirety for all purposes the following U.S. patent application and patents: Ser. No. 12/217,771 filed Jul. 7, 2008 issuing as U.S. Pat. No. 8,210,408 on Jul. 3, 2012, U.S. Pat. Nos. 5,094,373, 5,259,542, 5,664,717, and 6,286,738.

FIELD OF THE INVENTION

The invention relates to mast-style bicycle carriers configured for connection to a hitch at the rear of a vehicle.

BACKGROUND

Vehicle carrier racks are typically mounted on the exterior of a motor vehicle to support bicycles, skis, surf boards, kayaks, etc., above the ground. These racks are generally constructed of rigid frame members having arms extending horizontally for supporting objects such as bicycles. One type of rack that is popular for carrying bicycles is configured for connection to a vehicle hitch at the rear of a vehicle. Hitch racks are particularly desirable for people who want to carry bicycles without the difficulties of lifting, loading, and securing bicycles on top of a vehicle. However, there are some common problems with hitch racks. For example, hitch racks often block access to trunks or hatchback doors at the rear of vehicles. Some hitch racks also permit bicycles to swing while driving possibly causing damage to the bicycles or vehicle. Solutions have been proposed to address some of these problems resulting in designs that may be too complex, heavy, or awkward to use for some applications.

SUMMARY

A rack for carrying bicycles behind a vehicle includes a tongue configured for connection to the hitch underneath the rear bumper of the vehicle. A mast is pivotally connected to the tongue. A pair of arms are pivotally connected to an upper end portion of the mast and are equipped with mounts for securing bicycles on the arms.

DRAWINGS

FIG. 4 is a perspective view of the saddle mount and stabilizer shown in FIGS. 2 and 3.

FIG. 5 is an exploded view of the saddle mount and stabilizer shown in FIGS. 2-4.

FIGS. 6-8 are schematic side views of the rack shown in FIG. 1, illustrating pivoting motions of the rack.

FIGS. 11-14 are partial cross-sectional views of an arm release mechanism.

DESCRIPTION

Figure 1:
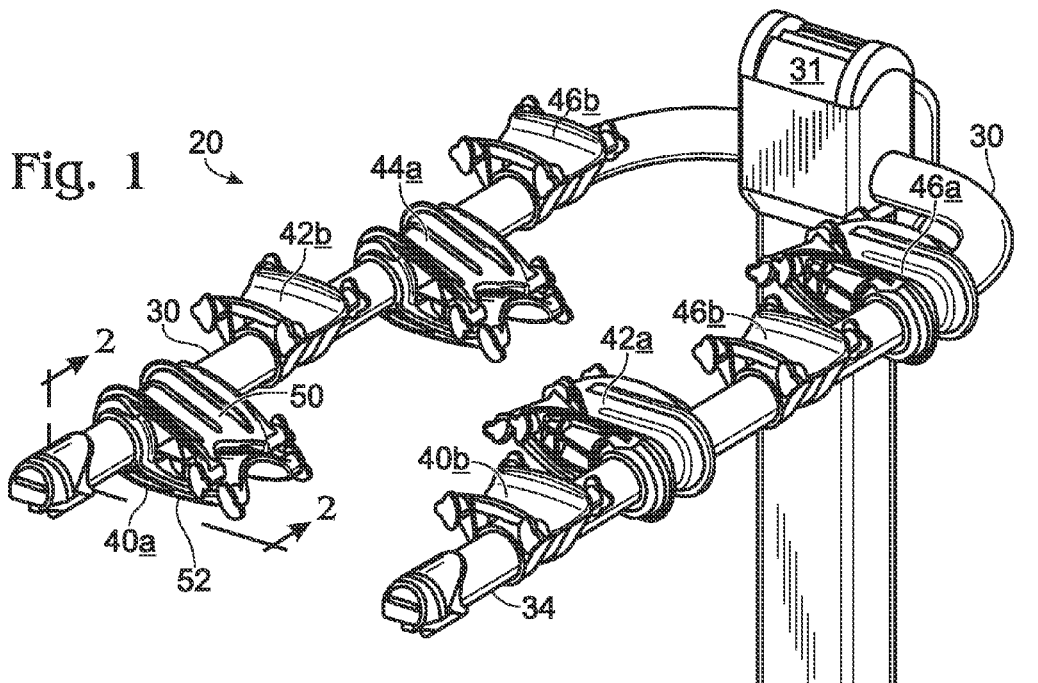
FIG. 1 is a perspective view of a bicycle rack configured for mounting to a hitch on the rear of a vehicle.

FIG. 1 shows bicycle rack 20 including tongue piece 22 configured for mounting in a hitch at the rear of a vehicle. Tongue piece 22 is connected to vertical portion 24. Mast portion 26 is pivotally mounted on vertical portion 24. U-shaped support 30 is pivotally connected to an upper portion of mast portion 26. Freedom of rotation movement of U-shaped support 30 is governed by release device 31, which is explained in more detail below. U-shaped support 30 has two arms 32 and 34. Multiple pairs of top tube mounts 40a-b, 42a-b, 44a-b and 46a-b are provided on arms 32 and 34. Each pair of mounts includes an isolated saddle mount on one arm, and a saddle mount with a top tube stabilizer on the other arm. For example, saddle mount 40b is configured to support a top tube of a bicycle. Mount 40a includes a saddle mount for supporting the top tube of a bicycle and a stabilizer, which is independently rotatable around arm 32 for gripping a down tube on a bicycle.

Figure 2:
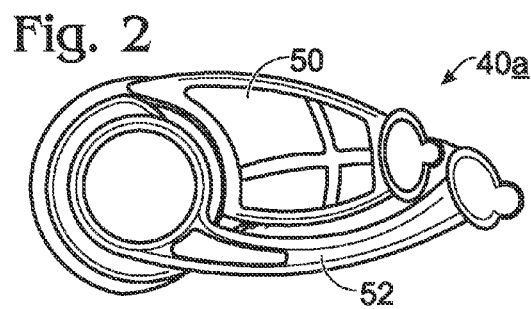
FIGS. 2 and 3 are side views of a saddle mount and stabilizer used on the arms of the rack shown in FIG. 1.
Figure 3:
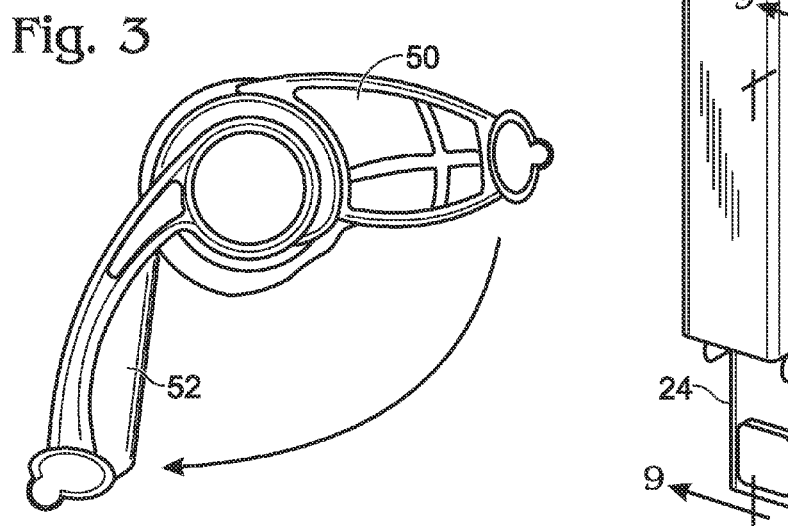

FIG. 2 shows an isolated side view of mount 40a including top tube mount 50, and down tube stabilizer 52. Stabilizer 52 is folded up against top tube mount 50 in a non-use position. FIG. 3 shows down tube stabilizer 52 rotated downward into a use position for supporting a bicycle. FIG. 4 shows a perspective view of mount 40a, with stabilizer 52 folded up to a non-use position. FIG. 5 shows an exploded view of the same mount. Stabilizer 52 has two collar portions 56, 58 which fit on opposing sides of central collar portion 60 of top tube saddle mount 50. Independent freedom of rotation of stabilizer 52 relative to top tube saddle mount 50 allows accommodation of bicycle frames having different frame geometries.

FIGS. 6-8 show folding movements of rack 20. FIG. 6 shows rack 20 locked and extended in an upright position for carrying bicycles. FIG. 7 shows arm 34 rotated downward into a vertical, collapsed position parallel with mast portion 26 when the rack is not being used to carry bicycles. Manipulation of pin 70 provides a release of mast portion 26 allowing it to rotate downward, as shown in FIG. 8.

Figure 10:
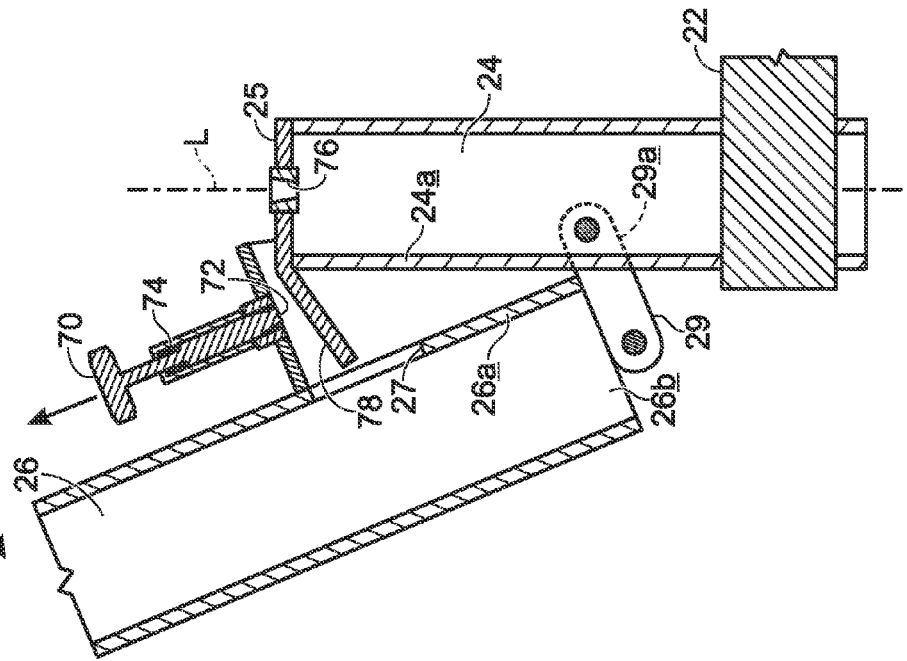
FIGS. 9 and 10 are partial cross-sectional views taken through FIG. 1, illustrating the rear pivoting and locking mechanism of the rack shown in FIG. 1.
Figure 9:
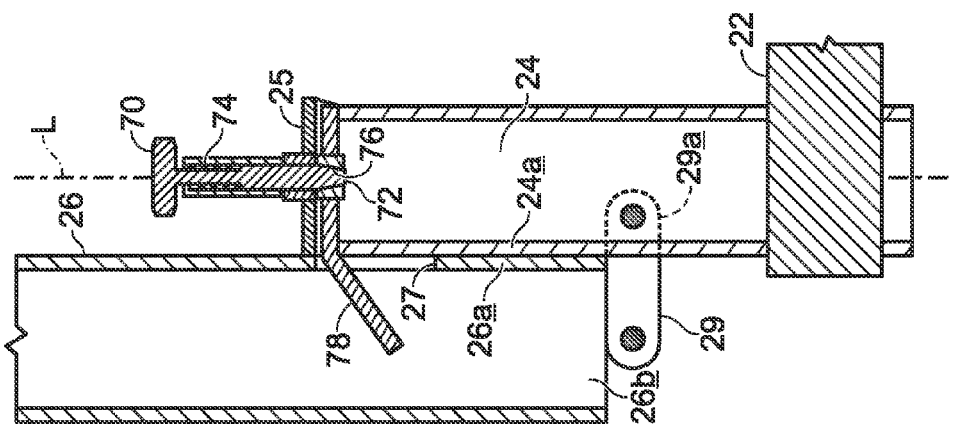

FIGS. 9 and 10 show an example of a release mechanism for permitting downward, rearward movement of mast portion 26, as illustrated in FIG. 8. Pin 70 may have a tapered end 72 which is biased by spring 74 into bushing 76. Pin 70 is fixed to the side of mast portion 26, while bushing 76 is fixed to the top of vertical portion 24. Accordingly, when pin 70 is engaged with bushing 76, vertical portion 24 and mast portion 26 are locked into a parallel vertical, parallel positions. As shown in FIG. 10, when pin 70 is manipulated upward out of bushing 76, then mast portion 26 is free to rotate downward and rearward thus permitting access to the rear of the vehicle. Ramp 78 is provided to facilitate smooth sliding re-engagement of vertical portion 24 with mast portion 26 when mast portion 26 is moved from down to vertical positions.

FIGS. 11-14 show details of an example of an arm lock and release device. A tubular axle connects the two arms and rotates in the mast portion through two plastic bushings. A single steel fin is welded to the arm axle and prevents the arms from rotating when the arms are in the up or down position. When the arms are up, the steel fin pushes against the front wall inside the mast to prevent the arms from rotating further up. The steel fin pushes against the latch dowel to prevent the arms from folding down. To allow the arms to rotate down, the latch dowel pin is pushed down inside the mast until it clears the fin. When the arms are down, a spring pin in the steel fin is captured by hooks on the trigger which prevents the arms from rotating up and out. The arms are prevented from rotating further back and down by the steel fin pressing against the plastic and metal stop formed from the mast and bushings. If the arms are pulled up and out, the trigger hooks will release the arms before anything breaks. To release the arms from either the up or down position, a red plastic trigger at the top of the mast is pushed. Pushing the trigger moves the hooks that hold the arms down. It also moves the latch dowel pin through a wire link and plastic latch box.

An exemplary mechanism is illustrated in FIGS. 11-14. As shown in FIG. 11, steel fin 86 is rigidly connected to or welded to U-shaped support 30. When arms 32 and 34 are in the horizontal use position, steel fin 86 is prevented from rotation by the front wall of mast portion 26 on one side, and dowel pin 88 on the other side. When button 90 is moved forward, then dowel pin 88 moves downward, thereby allowing fin 86 to rotate counterclockwise as arms 32 and 34 rotate downward into a collapsed position. FIG. 12 shows dowel pin 88 moved out of the way of fin 86. FIG. 13 shows fin 86 and arm 32 rotating counterclockwise. As shown in FIG. 14, when arm 32 is fully collapsed, parallel with mast portion 26, then spring pin 92 on fin 86 is caught by hook portion 98 which is rigidly connected to button 90, thus preventing the arms from rotating clockwise back toward the horizontal use position. When button 90 is pushed forward, then spring pin 92 is released, allowing fin 86 and arm support 30 to rotate clockwise toward the horizontal use position. Alternatively, hook portion 98 may be configured with a profile that permits release of the arms from the collapsed position simply by lifting the arms, without needing to press button 90. Once fin 86 is fully rotated against the front wall of mast portion 26, then dowel pin 88 is urged upward, thus preventing pin 86 from counterclockwise rotation, locking arms 32 and 34 into a use position for carrying bicycles.

The rack example described above provides an efficient design which is easy to use. Support arms may be pivoted to a use position by simply lifting the arms until they snap automatically into a locked horizontal position. Similarly, the mast may be pivoted to a vertical use position by simply lifting the mast until it snaps automatically into a locked vertical position. A simple pull pin mechanism allows the bicycle rack mast to tilt away from the vehicle, permitting access to the rear cargo area of the vehicle.

Although the present disclosure has been provided with reference to the foregoing operational principles and embodiments, it will be apparent to those skilled in the art that various changes in form and detail may be made without departing from the spirit and scope of the disclosure. The present disclosure is intended to embrace all such alternatives, modifications and variances. Where the disclosure recites "a," "a first," or "another" element, or the equivalent thereof, it should be interpreted to include one or more such elements, neither requiring nor excluding two or more such elements. Furthermore, any aspect shown or described with reference to a particular embodiment should be interpreted to be compatible with any other embodiment, alternative, modification, or variance.

We claim:

1. A bicycle carrier comprising
a tongue portion having a proximal end portion and a distal end portion, the proximal end portion being configured for connection to a vehicle hitch,
a mast structure having lower and upper end portions, the lower end portion being pivotally connected to the tongue portion,
a pair of arms rotatably connected to the upper portion of the mast structure, the arms being moveable between a collapsed position in which the arms are substantially parallel to the mast structure, and a use-position in which the arms are substantially perpendicular to the mast structure,
a locking device configured to secure the arms alternately in the collapsed position and in the use-position, including a coupling member pivotally connected to the upper portion of the mast structure and fixedly connected to the arms, the coupling member being pivotal between a down position and an up position corresponding to the use-position and the collapsed position of the arms respectively, and a switch provided on the upper portion of the mast structure, the switch having a first position and a second position, the switch being biased toward the first position, wherein the coupling member is free to rotate between the down position and the up position when the switch is in the second position, the switch being capable of locking the coupling member in the down position and in the up position when the switch is in the first position, wherein the first position of the switch that locks the coupling member in the down position is at a substantially same elevation on the mast as the first position of the switch that locks the coupling member in the up position, and
tube mounts on the arms for securing one or more bicycles to the arms.

2. The carrier of claim 1, wherein the tube mounts include one or more anti-sway devices.

3. The carrier of claim 1, wherein the switch includes a button configured for manipulation to permit collapse of the arms.

4. A bicycle carrier comprising
a tongue portion having a proximal end portion and a distal end portion, the proximal end portion being configured for connection to a vehicle hitch,
a mast structure having lower and upper end portions, the lower end portion being pivotally connected to the tongue portion,
a pair of arms rotatably connected to the upper portion of the mast structure, the arms being moveable between a collapsed position in which the arms are substantially parallel to the mast structure, and a use-position in which the arms are substantially perpendicular to the mast structure,
a release device located near the upper end portion of the mast structure for locking and releasing movement of the arms relative to the mast structure, the release device being configured to permit the arms to be pivoted from the collapsed position to the use-position and to lock automatically in the use-position while the release device remains at about a same elevation on the mast, and
tube mounts on the arms for securing one or more bicycles to the arms.

5. The carrier of claim 4, wherein the tube mounts include one or more anti-sway devices.

6. The carrier of claim 4, wherein a ramp is provided on the vertical portion for allowing smooth locking engagement of the mast structure into a parallel relationship with the vertical portion.

7. The carrier of claim 4, wherein the release device includes a button configured for manipulation to permit collapse of the arms.

8. The carrier of claim 1, wherein the coupling member includes a fin having a long axis parallel with the mast structure when the coupling member is in the down position.

9. The carrier of claim 1, wherein the coupling member rotates around an axis substantially perpendicular to the long axis of the vehicle.

10. The carrier of claim 8, wherein the fin has a tail portion that is blocked from moving by a pin when the coupling member is in the down position and the switch is in the first position.

11. The carrier of claim 8, wherein the fin has a pin and the switch has a latch arm, the pin being blocked from moving by the latch arm when the coupling device is in the up position and the switch is in the first position.

12. The carrier of claim 1, wherein the mast structure is moveable about an axis substantially perpendicular to the long axis of the vehicle and spaced above the vehicle hitch, thereby allowing the mast structure to move in a direction directly backward relative to the vehicle from a vertical use position.

13. A bicycle carrier comprising
- a tongue portion having a proximal end portion and a distal end portion, the proximal end portion being configured for connection to a vehicle hitch,
- a mast structure having lower and upper end portions, the lower end portion being pivotally connected to the tongue portion,
- a pair of arms rotatably connected to the upper portion of the mast structure, the arms being moveable between a collapsed position in which the arms are substantially parallel to the mast structure, and a use-position in which the arms are substantially perpendicular to the mast structure,
- a locking device configured to secure the arms alternately in the collapsed position and in the use-position, including a coupling member pivotally connected to the upper portion of the mast structure and fixedly connected to the arms, the coupling member being pivotal between a down position and an up position corresponding to the use-position and the collapsed position of the arms respectively, and a switch provided on the upper portion of the mast structure and including a latch arm, the switch having a first position and a second position, the switch being biased toward the first position, wherein the coupling member is free to rotate between the down position and the up position when the switch is in the second position, the switch being capable of locking the coupling member in the down position and in the up position when the switch is in the first position, the coupling member including a fin having a pin that is blocked from moving by the latch arm of the switch when the coupling device is in the up position and the switch is in the first position, and
- tube mounts on the arms for securing one or more bicycles to the arms.

14. The carrier of claim 13, wherein the tube mounts include one or more anti-sway devices.

15. The carrier of claim 13, wherein the switch includes a button configured for manipulation to permit collapse of the arms.

16. The carrier of claim 13, wherein the fin has a long axis parallel with the mast structure when the coupling member is in the down position.

17. The carrier of claim 13, wherein the coupling member rotates around an axis substantially perpendicular to the long axis of the vehicle.

18. The carrier of claim 13, wherein the mast structure is moveable about an axis substantially perpendicular to the long axis of the vehicle and spaced above the vehicle hitch, thereby allowing the mast structure to move in a direction directly backward relative to the vehicle from a vertical use position.

* * * * *